United States Patent [19]

Kim

[11] Patent Number: 5,542,385
[45] Date of Patent: Aug. 6, 1996

[54] INTAKE MANIFOLD FOR AN INTERNAL COMBUSTION ENGINE

[75] Inventor: Yoonsuk Kim, Kyungki-do, Rep. of Korea

[73] Assignee: Hyundai Motor Company, Rep. of Korea

[21] Appl. No.: 493,698

[22] Filed: Jun. 22, 1995

[30] Foreign Application Priority Data

Jun. 23, 1994 [KR] Rep. of Korea .................... 94-14447

[51] Int. Cl.⁶ .................... F01L 15/02; F02M 35/10
[52] U.S. Cl. .................... 123/184.52; 123/188.4
[58] Field of Search .................... 123/184.37, 184.45, 123/184.52, 184.24, 184.34, 184.47, 184.48, 184.55, 184.56, 188.4

[56] References Cited

U.S. PATENT DOCUMENTS

| | | | |
|---|---|---|---|
| 1,719,816 | 7/1929 | Wang | 123/188.4 |
| 4,612,903 | 9/1986 | Urabe et al. | 123/184.45 |
| 4,726,343 | 2/1988 | Kruger | 123/184.45 |
| 4,765,286 | 8/1988 | Lyjak et al. | |
| 4,911,111 | 3/1990 | Matsunaga | 123/184.56 |
| 5,261,359 | 11/1993 | Hull | 123/188.4 |

Primary Examiner—Marguerite McMahon
Attorney, Agent, or Firm—Finnegan, Henderson, Farabow, Garrett & Dunner

[57] ABSTRACT

Disclosed is an intake manifold system for an internal combustion engine, which includes a surge tank for temporarily storing the air, an intake manifold for connecting the surge tank with combustion chambers of cylinders, the intake manifold having a plurality of high speed tubes for taking in the air from the surge tank and a plurality of medium/low speed tubes for taking in the air from the surge tank, the internal diameter of the high speed tubes being greater than that of the medium/low speed tubes, each of the cylinders being connected with a pair of the high speed tube and the medium/low speed tube, an intake manifold valve for selectively opening and closing the inlet openings of the high speed and medium/low speed tubes of the intake manifold, a valve guide attached to the inside surface of the surge tank for slidably guiding the intake manifold valve, and a drive means for driving the manifold valve device according to an engine running speed, whereby the air flows via the high speed tubes into the combustion chambers at a high engine running speed more rapidly than at a medium/low engine running speed.

12 Claims, 13 Drawing Sheets

PRIOR ART

INTAKE MANIFOLD FOR AN INTERNAL COMBUSTION ENGINE

BACKGROUND OF THE INVENTION

1. Field of the Invention

The present invention concerns an intake manifold for an internal combustion engine.

2. Description of the Conventional Art

The amount and state of the air flow into the combustion chambers of an engine considerably affects the power, exhaust and fuel consumption rate of the engine. Accordingly it is desirable to reduce the resistance of the intake air flow and to regulate the flow of the intake air to fit the running condition of the engine. One of the methods for increasing the engine efficiency is to cause the intake air to swirl in the combustion chambers. However, this method can not provide a desirable engine efficiency over a wide engine speed range. The U.S. Pat. No. 4,765,286 discloses an intake manifold for an internal combustion engine, which has a selectively controlled variable length flow path whereby the manifold may be resonantly tuned for optimum performance over a wide engine speed range. Although the patent works satisfactorily, the internal structure of the manifold is much complicated to provide the selectively controlled variable length flow path, thereby decreasing the production efficiency thereof.

SUMMARY OF THE INVENTION

It is an object of the present invention to provide an intake manifold system for an internal combustion engine, which has a simple means for regulating the intake air flow, so that the engine efficiency is improved over a wide speed range, thereby providing a uniform torque and improved fuel consumption ratio.

According to an embodiment of the present invention, an intake manifold system for an internal combustion engine comprises:

a surge tank for temporarily storing the air;

an intake manifold for connecting the surge tank with combustion chambers of cylinders, the intake manifold having a plurality of high speed tubes for taking in the air from the surge tank and a plurality of medium/low speed tubes for taking in the air from the surge tank, the internal diameter of the high speed tubes being greater than that of the medium/low speed tubes, each of the cylinders being connected with a pair of the high speed tube and the medium/low speed tube;

an intake manifold valve for selectively opening and closing the inlet openings of the high speed and medium/low speed tubes of the intake manifold;

a valve guide attached to the inside surface of the surge tank for slidably guiding the intake manifold valve; and a drive means for driving the manifold valve device according to an engine running speed, whereby the air flows via the high speed tubes into the combustion chambers at a high engine running speed more rapidly than at a medium/low engine running speed.

In one aspect of the present invention, the intake manifold valve has a plurality of valve openings, the number of the valve openings is such that each may encounter one cylinder, and the size of the valve opening is such as to correspond with that of the inlet opening of the high speed tube. The intake manifold valve is so designed as to open only the high speed tubes at a high engine running speed or only the medium/low speed tubes at a medium/low engine running speed.

In another aspect of the present invention, the drive means includes a vacuum actuator connected with the intake manifold system via a tube. The actuator is actuated by the vacuum produced by said intake manifold system. Or otherwise, the drive means includes a rack formed in an end part of the connecting rod for gearing with a pinion of a reversely rotatable motor, which is controlled by an electronic control unit according to the signals generated by a vehicle speed sensor and throttle opening sensor.

The present invention will now be more specifically described with reference to the drawings attached only by way of example.

DETAILED DESCRIPTION OF THE PREFERRED EMBODIMENT

Figure 1:
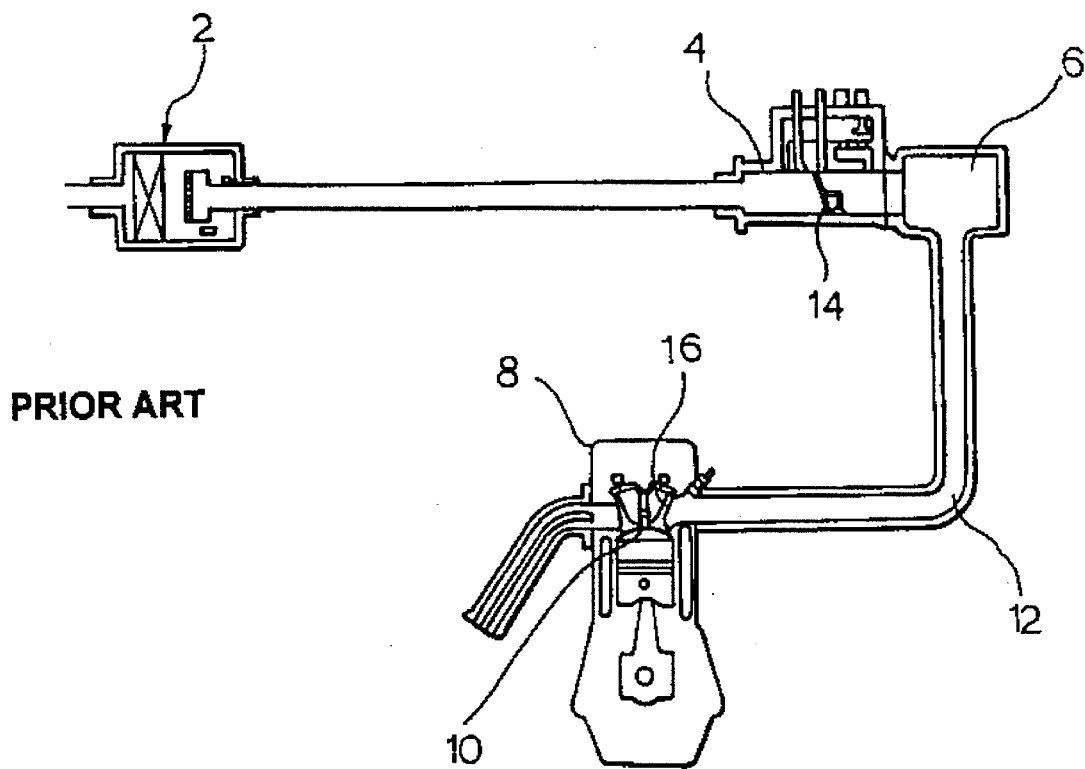
FIG. 1 is a schematic diagram for illustrating the structure of a conventional intake manifold system of an internal combustion engine.
Figure 2:
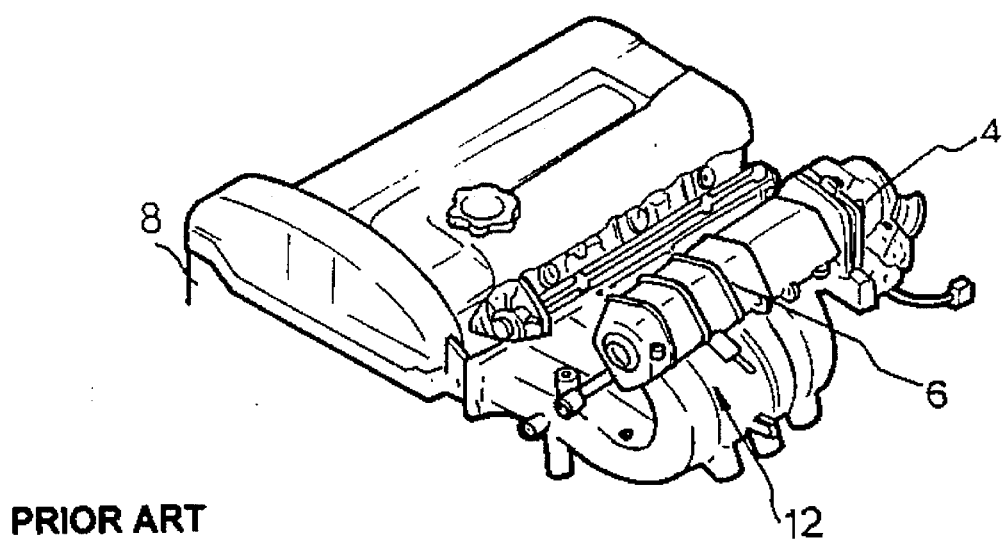
FIG. 2 is a schematic perspective view of a conventional intake manifold system mounted on an engine block.

As shown in FIGS. 1 and 2, the structure of a conventional intake manifold system of an internal combustion engine includes an air cleaner 2 for filtering the intake air, a throttle body 4 with a throttle valve 14 for regulating the amount of the intake air, a surge tank 6 for temporarily storing the air from the throttle body 4, and an intake manifold 12 for delivering the air of the surge tank 6 to the combustion chambers 10 of the cylinder head 8. The intake air filtered by the air cleaner 2 is regulated by the throttle valve 14 supplied to the surge tank 6. When the intake valve 16 is opened, the air of the surge tank 6 is sucked by the negative pressure of the combustion chamber 10 flowing into it and mixed with a fuel to be burnt.

Figure 3:
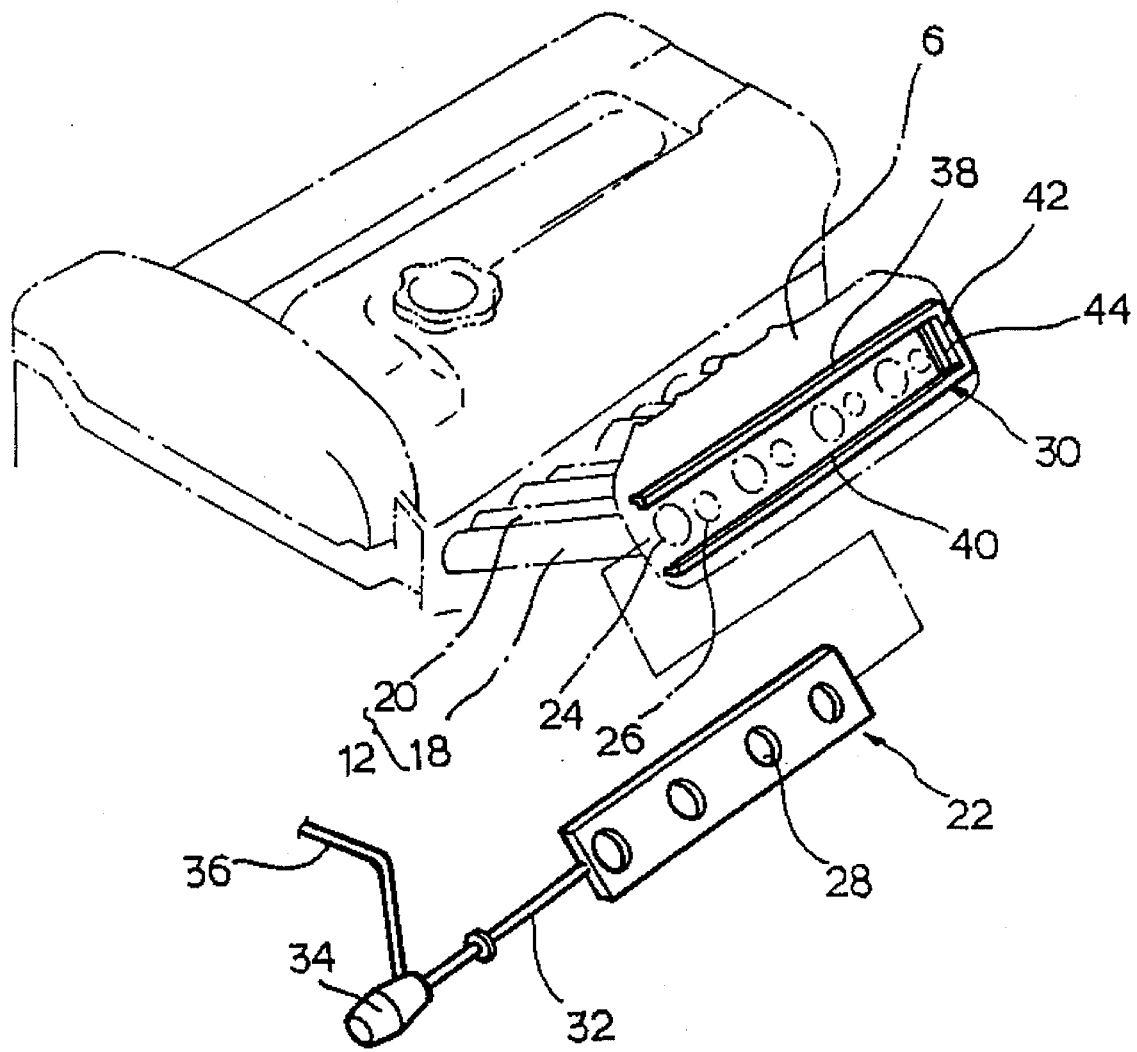
FIG. 3 is a partially exploded schematic diagram for illustrating a manifold valve device according to a first embodiment of the present invention.

Referring to FIG. 3, according to the first embodiment of the present invention, an intake manifold 12 for connecting the surge tank 6 with the combustion chambers 10 includes a plurality of high speed tubes 18 with inlet opening 24 and a plurality of medium/low speed tubes 20 with inlet opening 26. The diameter of the inlet opening 24 of the high speed tubes 18 is made greater than that of the medium/low speed tubes 20, so that the air may flow into the combustion chambers at the high engine running speed more rapidly than at the medium/low engine running speed. An intake manifold valve 22 is attached to the inside surface of the surge tank 6 so as to selectively open and close the inlet openings 24 and 26 of the high speed and medium/low speed tubes 18 and 20 of the intake manifold 12.

A plurality of valve openings 28 are formed in the intake manifold valve 22 so as to selectively open the inlet openings 24 or 26 by slidably moving the intake manifold valve 22, which is slidably mounted in a valve guide 30 attached to the inside surface of the surge tank 6. The number of the valve openings 28 is such that each may encounter one cylinder. The size of the valve opening 28 is determined so as to correspond with that of the inlet opening 24 of the high speed tube 18 of the intake manifold 12. A connecting rod 32 is fixedly attached to one end of the intake manifold valve 22. A vacuum actuator 34 is mounted to the free end of the connecting rod 32 to actuate by means of vacuum. The actuator 34 is connected with the intake manifold system via a tube 36, actuated by the vacuum produced by the intake manifold system. Working of the actuator 34 causes the intake manifold valve 22 to slidably reciprocate along the valve guide 30, which is well known in the art.

Figure 4:
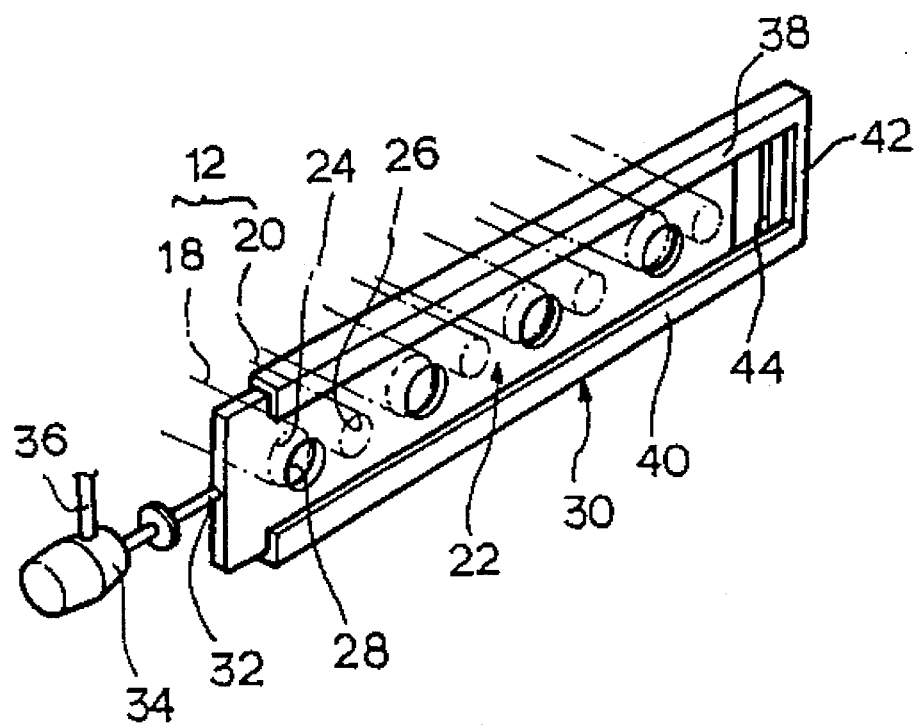
FIG. 4 is a perspective view for schematically illustrating the position of the manifold valve device of FIG. 3 opening high speed part of the manifold inlet openings according to the first embodiment of the present invention.
Figure 5:
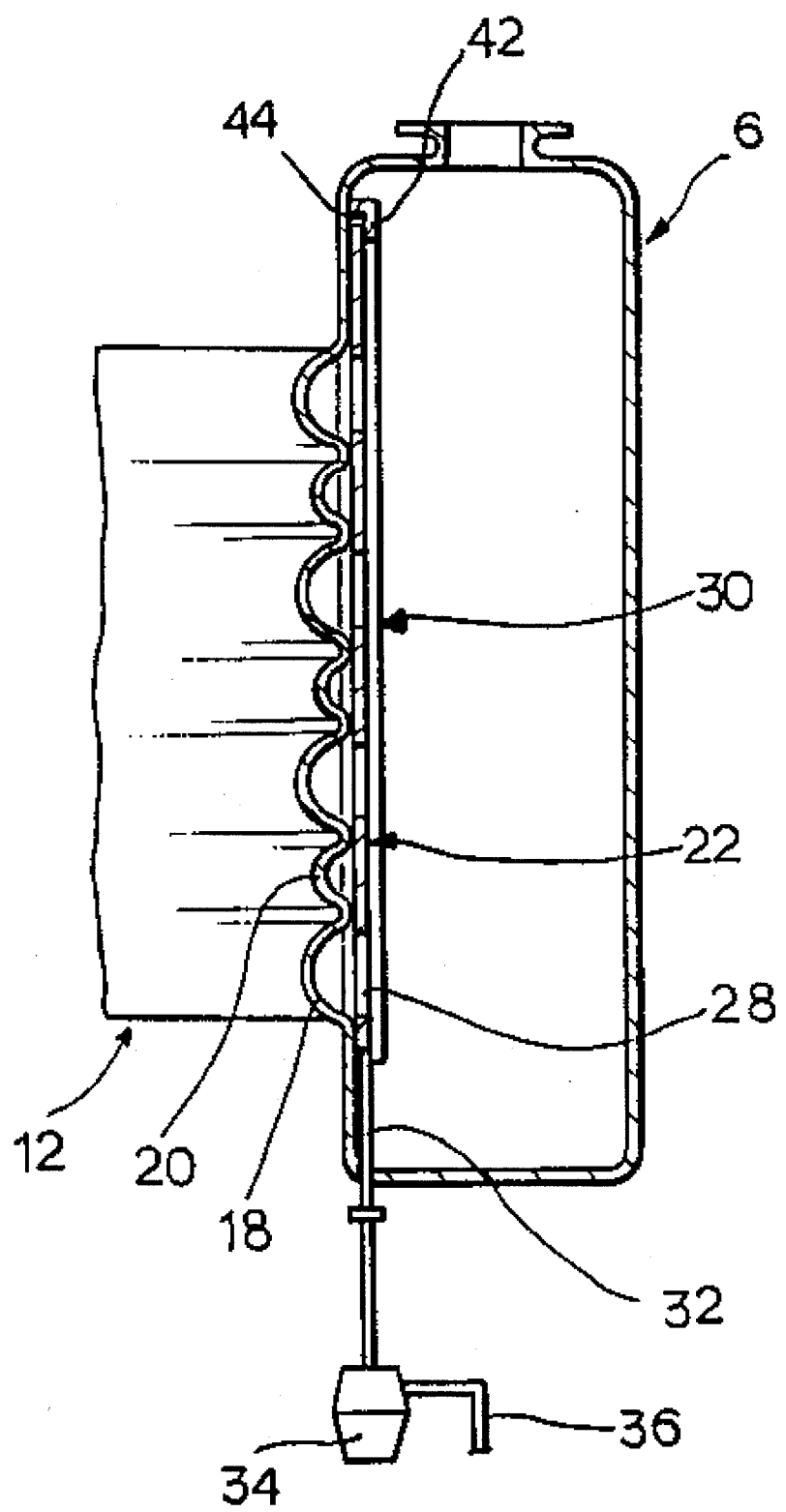
FIG. 5 is a plane cross sectional view of the manifold system for illustrating the position of the manifold valve device corresponding to FIG. 4.

The valve guide 30 has three edges provided with an angled flange 38, 40, 42 for snugly and slidably fitting the intake manifold valve 22 and keeping it from being detached. The other edge is opened to allow the reciprocating movement of the intake manifold valve 22. Referring to FIG. 3, there is further provided in the end flange 42 a buffer 44 made of a resilient materials to absorb the impact caused by the intake manifold valve 22 being pushed to the inner surface of the end flange 42. When the engine runs at a high speed, a relatively high vacuum is formed in the intake manifold system causing the actuator 34 to pull the connecting rod 32, so that the valve openings 28 of the intake manifold valve 22 correspond with the large inlet openings 24 of the high speed part 18 of the intake manifold 12, as shown in FIGS. 4 and 5. In this case, the small inlet openings 26 of the medium/low speed tubes 20 are closed by the surface portions of the manifold valve 22 between the valve openings 28. Then, the air stored in the surge tank 6 is introduced via the inlet openings 24 of the high speed part 18 to the combustion chambers.

Figure 6:
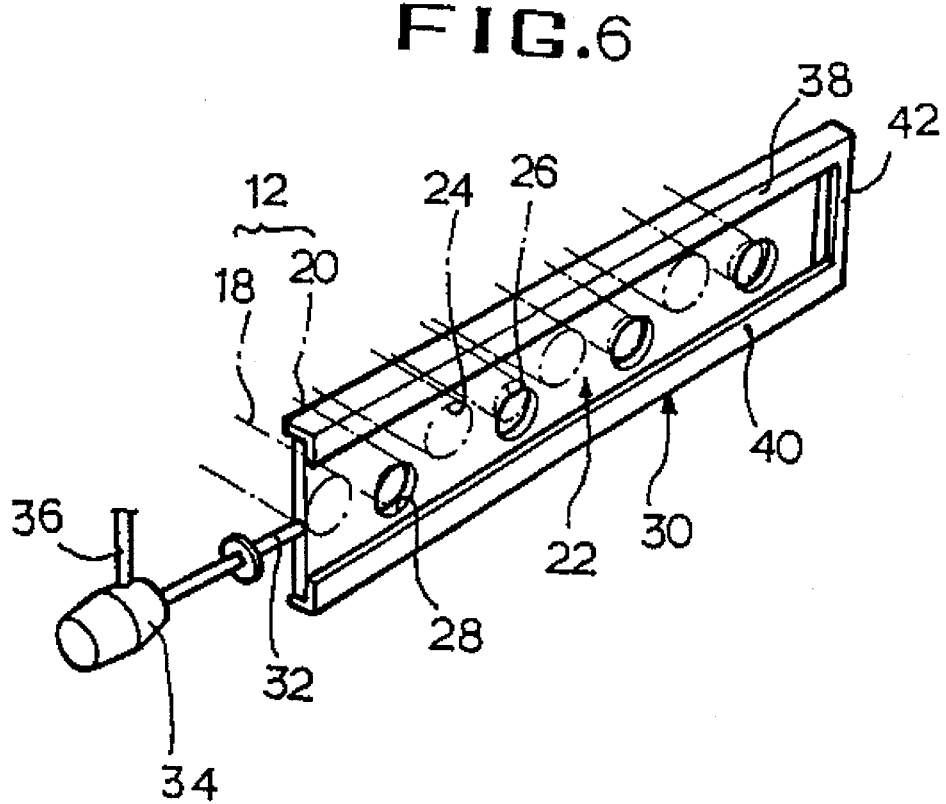
FIG. 6 is a perspective view for schematically illustrating the position of the manifold valve device of FIG. 3 opening medium/low speed part of the manifold inlet openings according to the first embodiment of the present invention.
Figure 7:
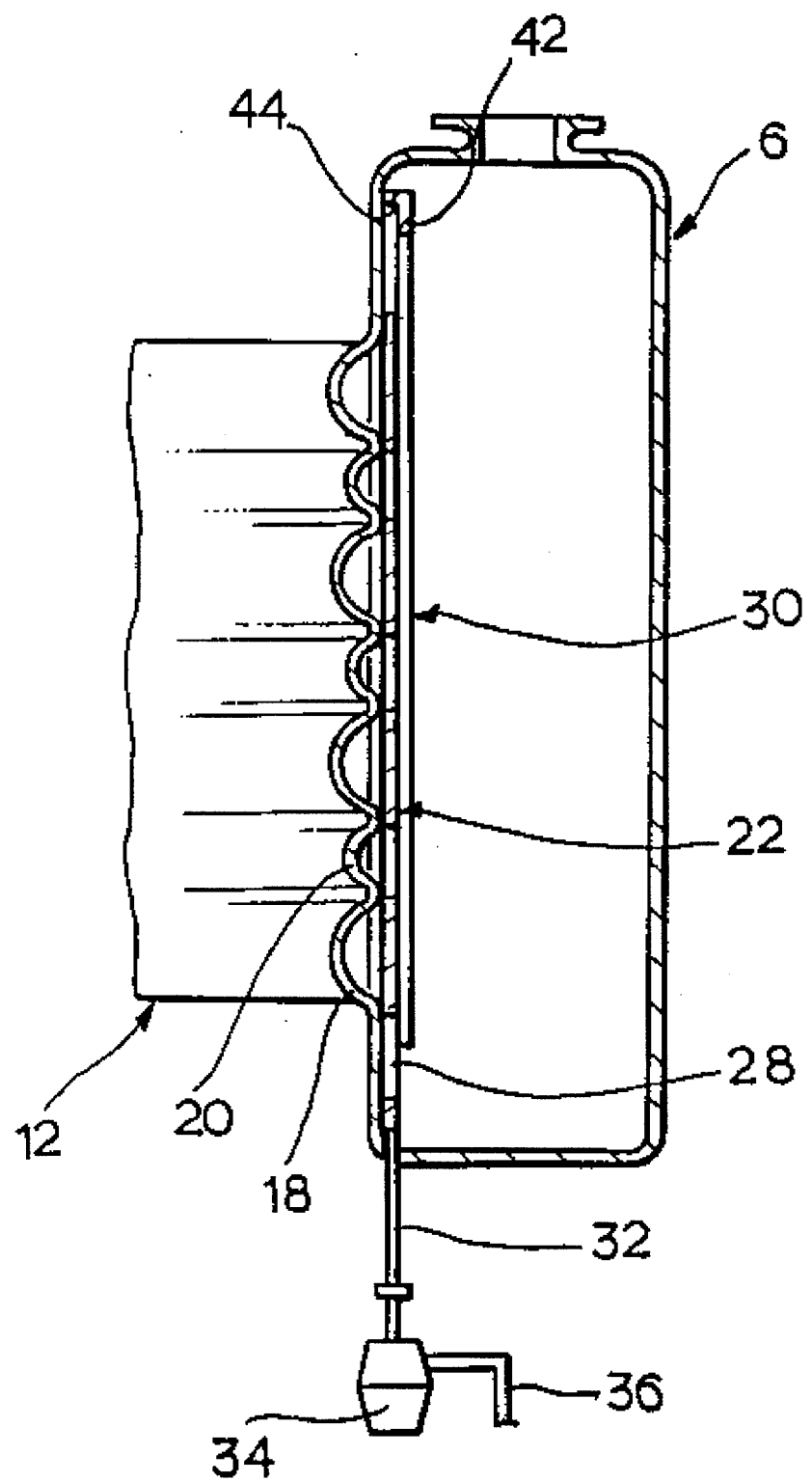
FIG. 7 is a plane cross sectional view of the manifold system for illustrating the position of the manifold valve device corresponding to FIG. 6.

When the engine runs at a medium or low speed, the degree of the vacuum formed in the intake manifold system is decreased so as to cause the actuator 34 to push the connecting rod 32, so that the small inlet openings 26 of the medium/low speed tubes 20 of the intake manifold valve 22 correspond with the valve openings 28, as shown in FIGS. 6 and 7. In this case, the inlet openings 24 of the high speed tubes 18 are closed by the surface portions of the intake manifold valve 22 between the valve openings 28. Likewise, the air stored in the surge tank 6 is introduced via the inlet openings 26 of the medium/low speed tubes 20 to the combustion chambers. Thus, the vacuum formed in the intake manifold system causes the manifold valve 22 to move forward or backward, thus selectively and automatically opening the large inlet openings 24 or small inlet openings 26 according the engine running condition.

Figure 8:
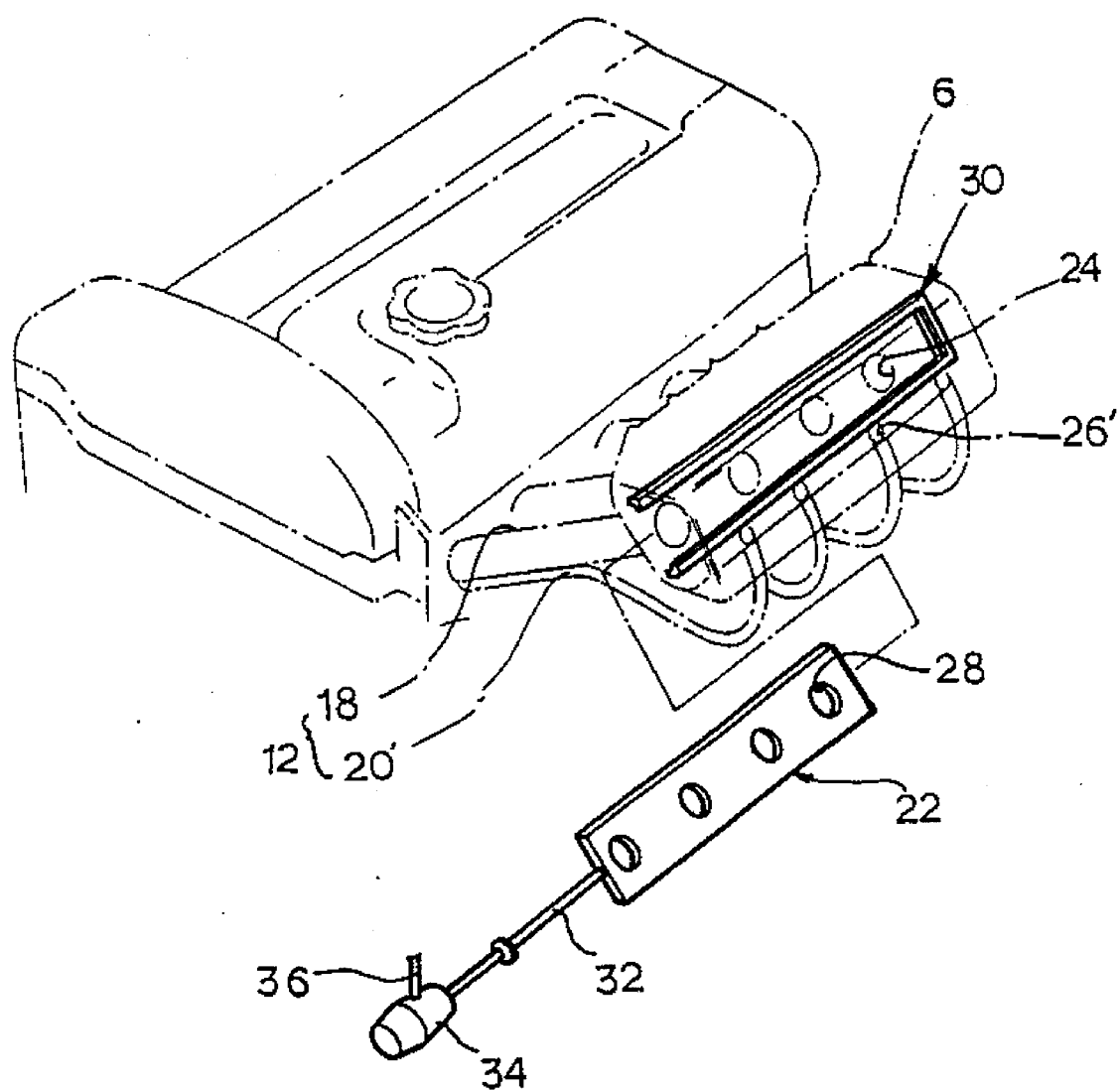
FIG. 8 is a partially exploded schematic diagram for illustrating a manifold valve device according to a second embodiment of the present invention.

The second embodiment as shown in FIG. 8 is designed so that the inlet openings 24 of the high speed tubes 18 of the intake manifold 12 may only be closed and opened by moving the intake manifold valve 22. The intake manifold valve 22 and valve guide 30 are mounted against the large inlet openings 24 of the high speed tubes of the intake manifold 12, as in the previous embodiment. However, the small inlet openings 26' of the medium/low speed tubes 20' of the intake manifold 12 are provided in the inside part of the surge tank 6 opposite to the inside part of the large inlet openings 24, and opened all the time. Thus, the high speed tubes 18 are preferably mounted closer to the combustion chambers 10 than the medium/low speed tubes 20', so that the length of the flow path of the medium/low speed tube 20' becomes longer than that of the high speed tube 18.

Figure 9:
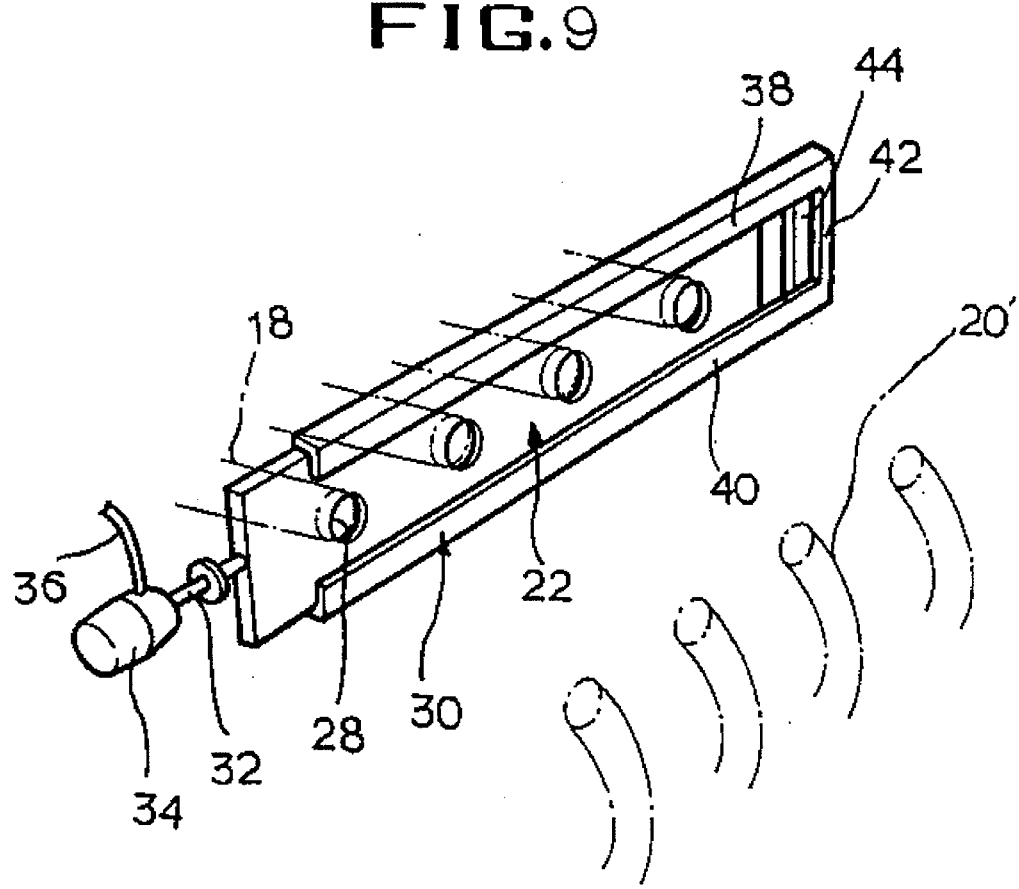
FIG. 9 is a perspective view for schematically illustrating the position of the manifold valve device of FIG. 8 opening high speed part of the manifold inlet openings according to the second embodiment of the present invention.
Figure 10:
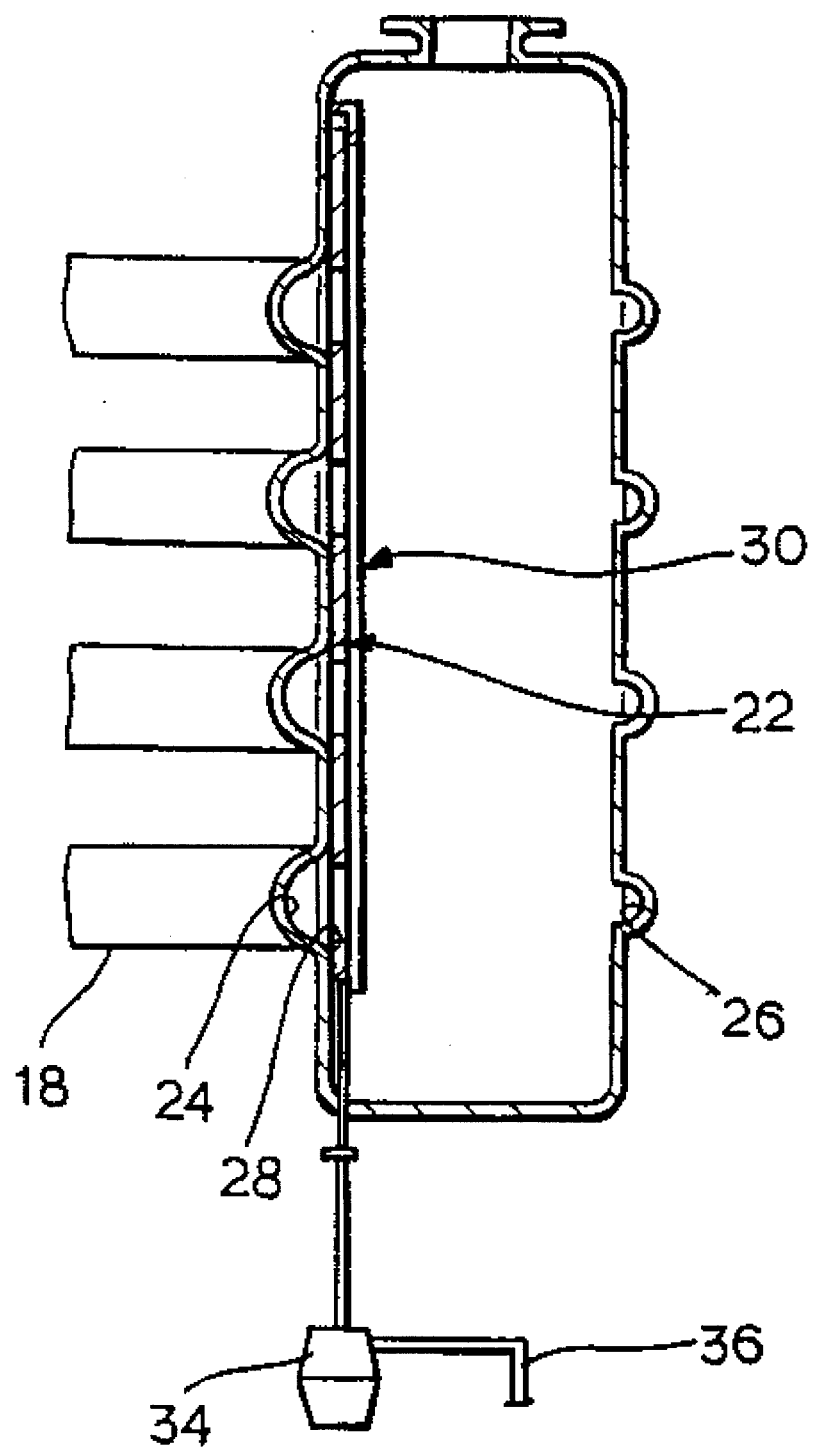
FIG. 10 is a plane cross sectional view of the manifold system for illustrating the position of the manifold valve device corresponding to FIG. 9.

When the engine runs at a high speed, a relatively high vacuum is formed in the intake manifold system causing the actuator 34 to pull the connecting rod 32, so that the valve openings 28 of the intake manifold valve 22 correspond with the large inlet openings 24 of the high speed tubes 18 of the intake manifold 12, as shown in FIGS. 9 and 10. Then, the air stored in the surge tank 6 is introduced via the inlet openings 24 and 26' of the high and medium/low speed tubes 18, 20' to the combustion chambers.

Figure 11:
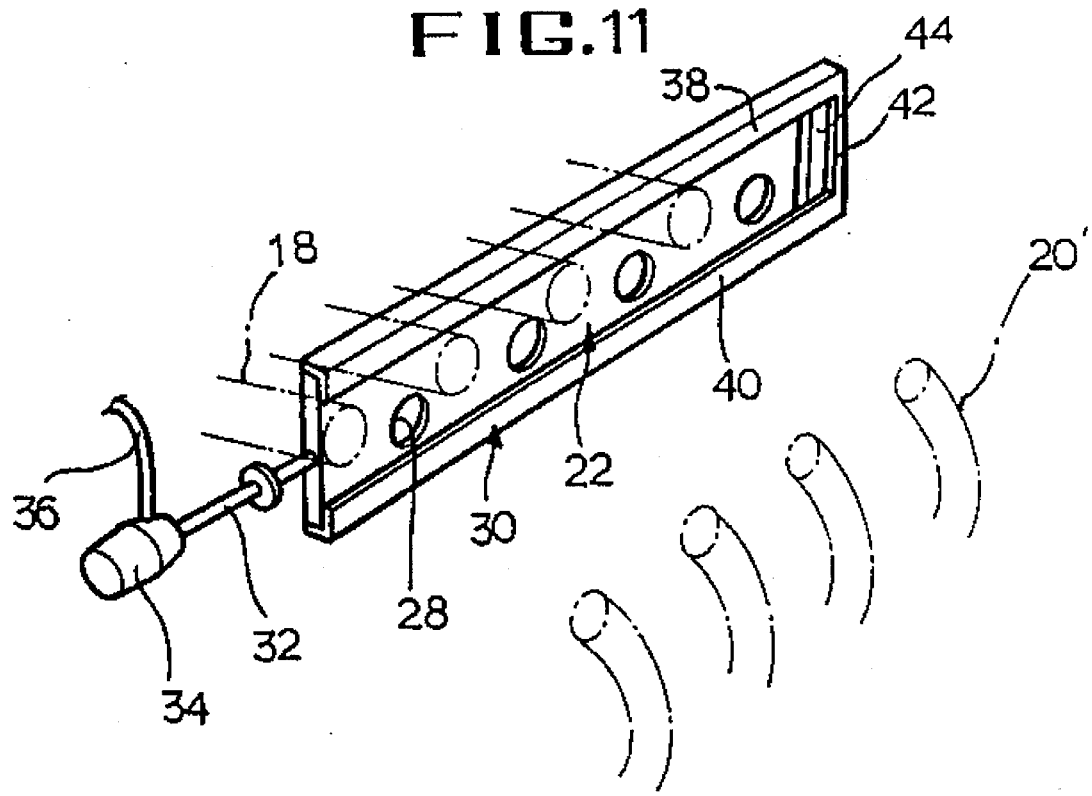
FIG. 11 is a perspective view for schematically illustrating the position of the manifold valve device of FIG. 8 only opening medium/low speed part of the manifold inlet openings according to the second embodiment of the present invention.
Figure 12:
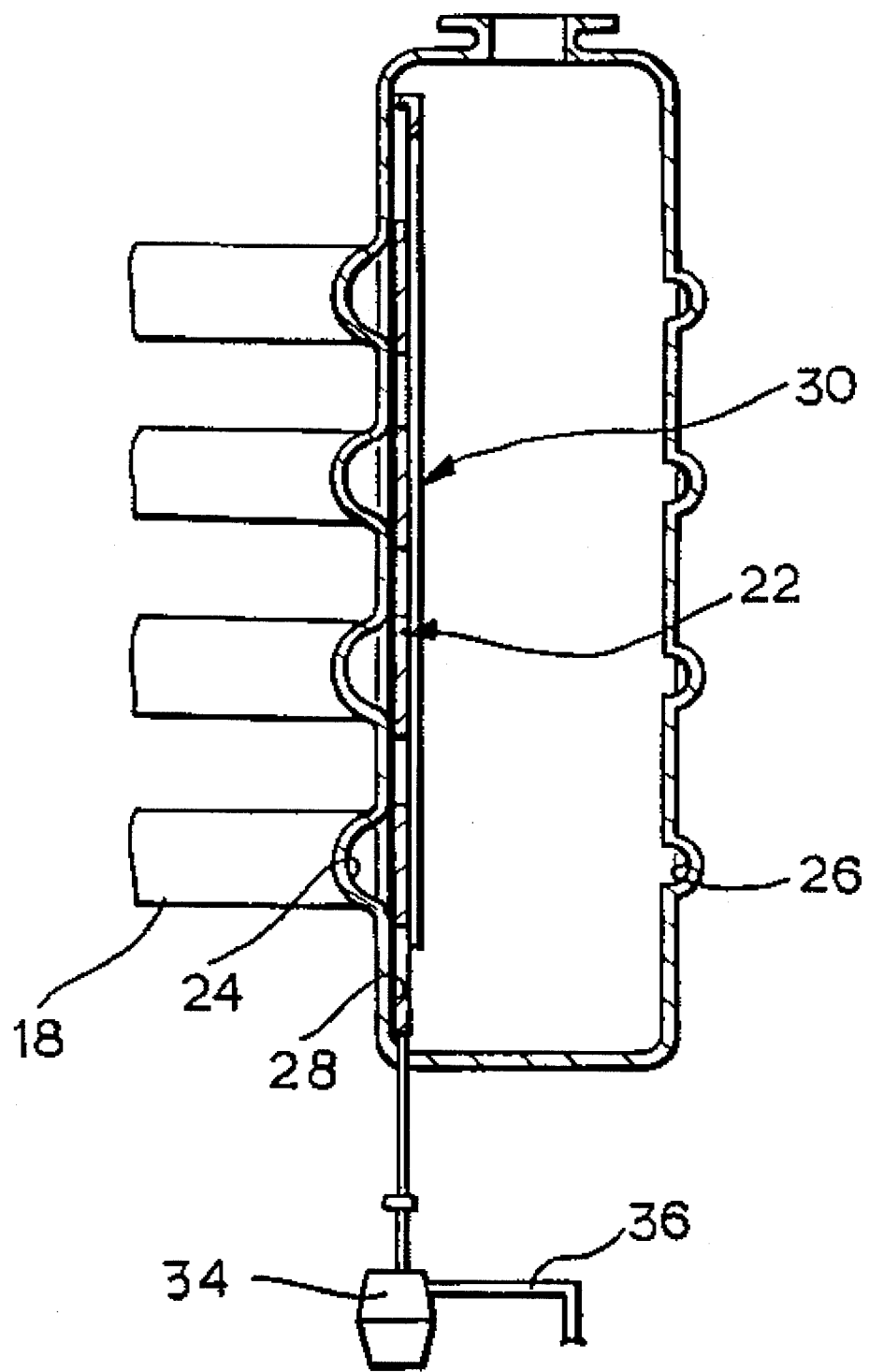
FIG. 12 is a plane cross sectional view of the manifold system for illustrating the position of the manifold valve device corresponding to FIG. 11.

When the engine runs at a medium or low speed, a relatively low vacuum is formed in the intake manifold system causing the actuator 34 to push the connecting rod 32 forward so as to close the large inlet openings 24 of the high speed tubes 18, as shown in FIGS. 11 and 12. Then, the air stored in the surge tank 6 is introduced only via the inlet openings 26' of the medium/low speed tubes 20' to the combustion chambers.

Figure 13:
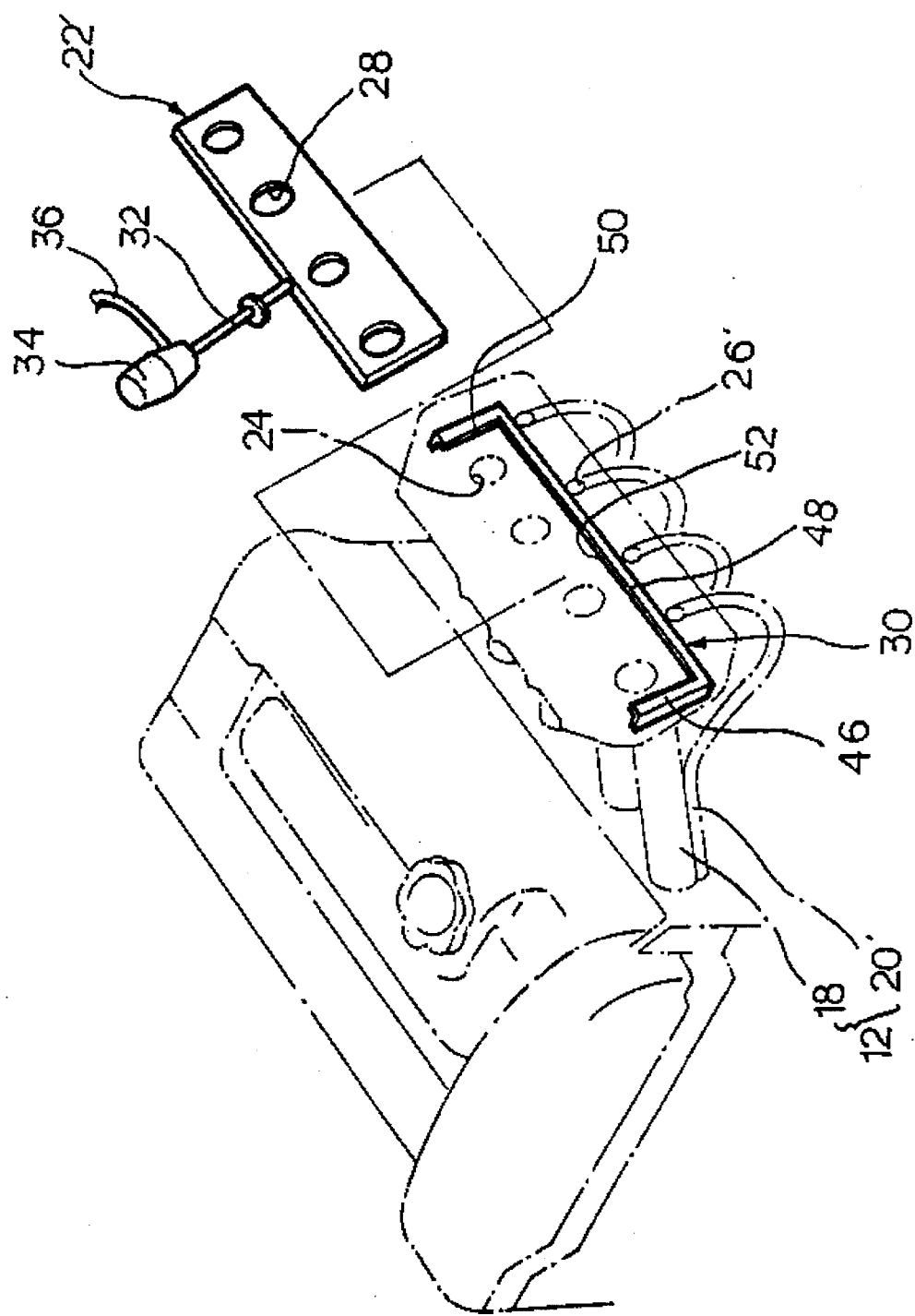
FIG. 13 is a partially exploded schematic diagram for illustrating a manifold valve device according to a third embodiment of the present invention.
Figure 14:
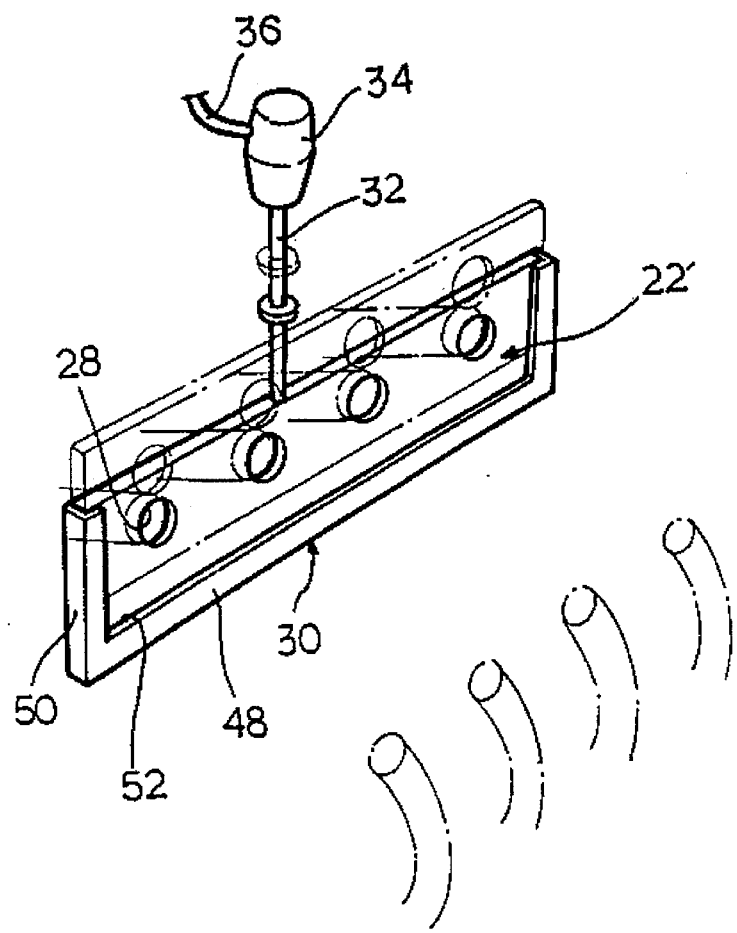
FIG. 14 is a schematic perspective view for illustrating the working state of the manifold valve device according to the third embodiment of the present invention.

The third embodiment of FIGS. 13 and 14 shows that the intake manifold valve 22 is designed to move upwardly and downwardly, which is different from the first and second embodiments to move it from side to side. Hence, the upper edge of the valve guide 30 is opened so as to allow the upward and downward movement of the intake manifold valve 22. The remaining three edges are provided with an angled flange 46, 48 and 50 for snugly and slidably fitting the intake manifold valve 22 and keeping it from being detached. Referring to FIG. 13, there is further provided in the lower flange 52 a buffer made of a resilient materials to absorb the impact caused by the intake manifold valve 22 being pushed to the inner surface of the lower flange 52.

Figure 15:
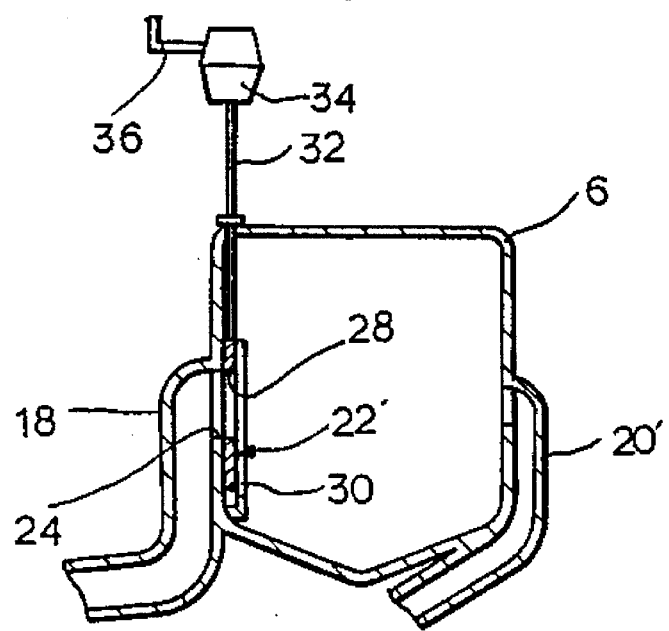
FIG. 15 is a cross sectional view of the manifold system for illustrating the position of the manifold valve device opening high speed part of the manifold inlet openings according to the third embodiment of the present invention.

When the engine runs at a high speed, a relatively high vacuum is formed in the intake manifold system causing the actuator 34 to downwardly push the connecting rod 32, so that the valve openings 28 of the intake manifold valve 22 correspond with the large inlet openings 24 of the high speed tubes 18 of the intake manifold 12, as shown in FIG. 15. In this case, the inlet openings of the medium/low speed tubes 20' are opened all the time. Then, the air stored in the surge tank 6 is introduced via the inlet openings 24 of the high and medium/low speed tubes 18 and 20' to the combustion chambers.

Figure 16:
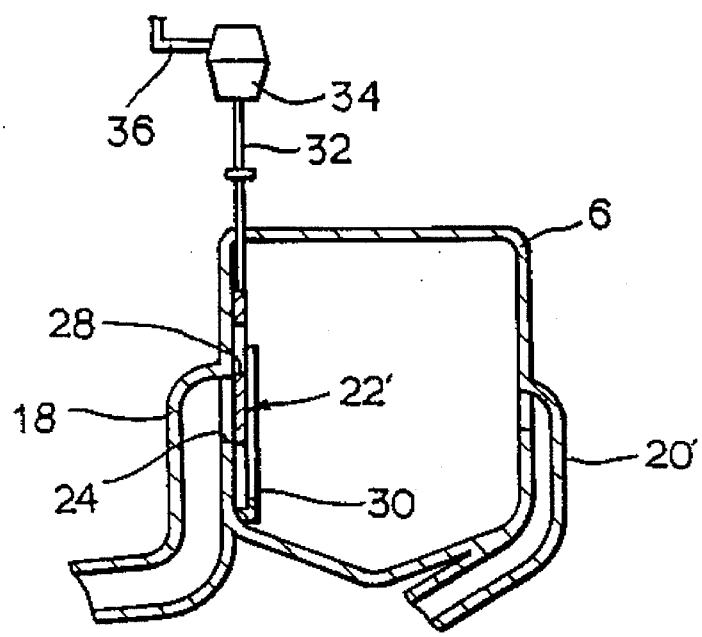
FIG. 16 is a cross sectional view similar to FIG. 15 but only opening medium/low speed part of the manifold inlet openings according to the third embodiment of the present invention.

On the contrary, when the engine runs at a medium or low speed, a relatively low vacuum is formed in the intake manifold system causing the actuator 34 to upwardly pull the connecting rod 32 so as to close the large inlet openings 24 of the high speed tubes 18, as shown in FIGS. 16. Then, the air stored in the surge tank 6 is introduced only via the inlet openings of the medium/low speed tubes 20' to the combustion chambers.

Figure 17:
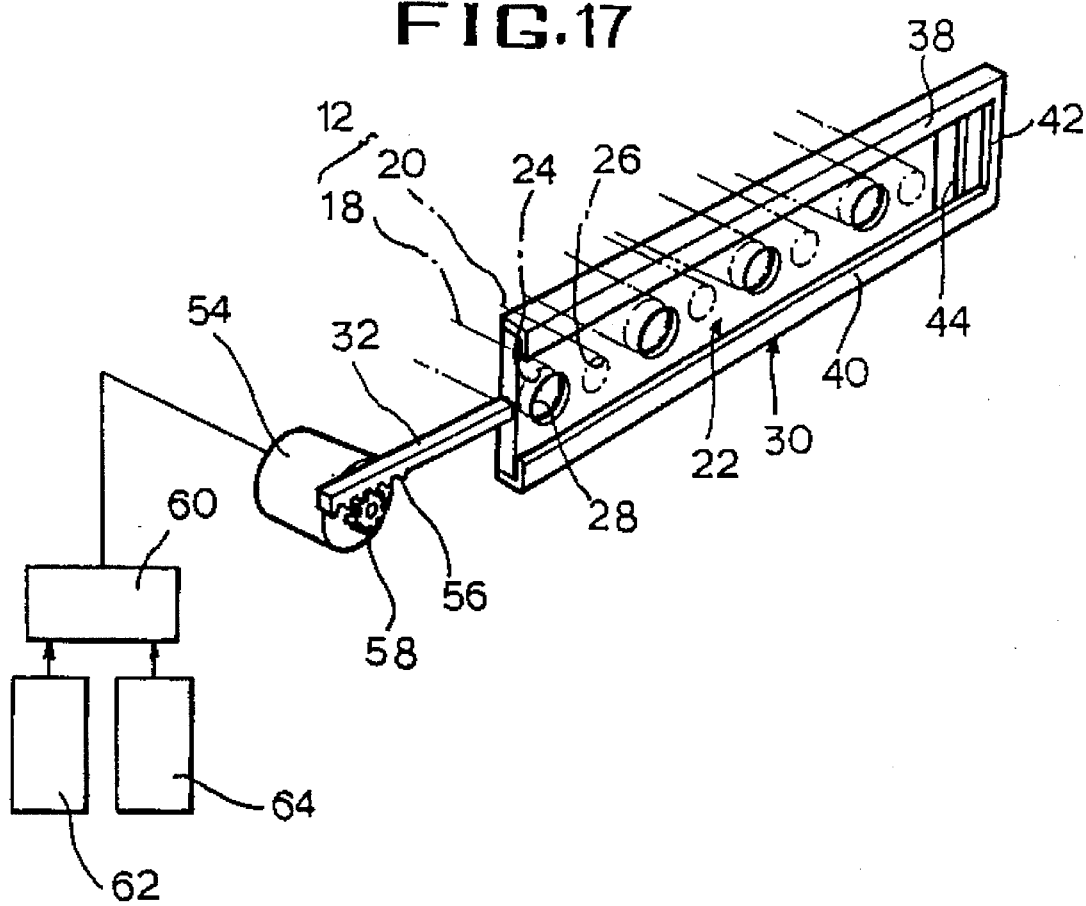
FIG. 17 is a schematic perspective view for illustrating a reversely rotatable motor employed to drive the manifold valve device according to the fourth embodiment of the present invention.
Figure 18:
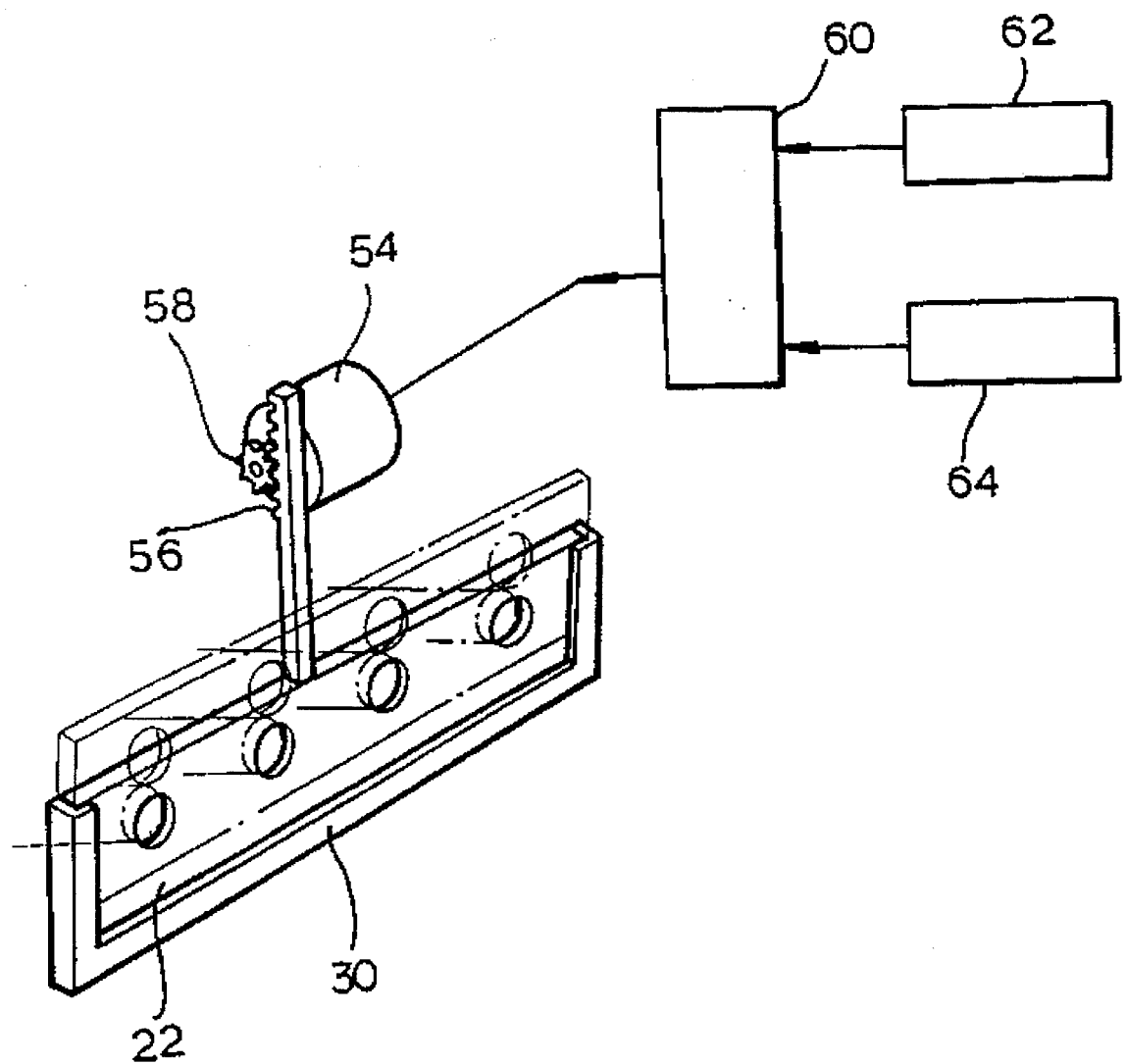
FIG. 18 is a schematic perspective view for illustrating a reversely rotatable motor employed to drive the manifold valve device according to the fourth embodiment of the present invention.

The fourth embodiment of FIGS. 17 and 18 employs a reversely rotatable motor 54 to drive the intake manifold valve 22. The structures of the intake manifold valve 22 and valve guide 30 are the same with those of the first and second embodiments. A rack 56 is formed in an end part of the connecting rod 32 for gearing with a pinion 58 of the reversely rotatable motor 54, which is controlled by an electronic control unit according to the signals generated by a vehicle speed sensor 64 and throttle opening sensor 62. Thus, the manifold valve device 22 reciprocates to selectively open the inlet openings of the high or medium/low speed tubes 18 or 20' of the intake manifold according to the engine running speed.

What is claimed is:

1. An intake manifold system for an internal combustion engine comprising:
   a surge tank for temporarily storing the air;
   an intake manifold for connecting said surge tank with combustion chambers of cylinders, said intake manifold having a plurality of high speed tubes for taking in the air from said surge tank and a plurality of medium/low speed tubes for taking in the air from said surge tank, the internal diameter of said high speed tubes being greater than that of said medium/low speed tubes, each of said cylinders being connected with one high speed tube and one medium/low speed tube;
   an intake manifold valve for selectively opening and closing the inlet openings of said high speed and medium/low speed tubes of said intake manifold;
   a valve guide attached to the inside surface of said surge tank for guiding said intake manifold valve; and
   a drive means for driving said manifold valve device according to an engine running speed, whereby the air flows via said high speed tubes into said combustion chambers at a high engine running speed more rapidly than at a medium/low engine running speed.

2. The intake manifold system as defined in claim 1, wherein said high and medium/low speed tubes are arranged parallel.

3. The intake manifold system as defined in claim 1, wherein the length of said medium/low speed tubes is longer than that of said high speed tubes.

4. The intake manifold system as defined in claim 1, wherein said intake manifold valve has a plurality of valve openings, the number of said valve openings is such that each may encounter one cylinder, and the size of said valve opening is such as to correspond with that of the inlet opening of said high speed tube.

5. The intake manifold system as defined in claim 1 or 4, wherein said intake manifold valve also selectively opens and closes the inlet opening of the medium/low speed tubes and is so designed as to open only said high speed tubes at a high engine running speed or only said medium/low speed tubes at a medium/low engine running speed.

6. The intake manifold system as defined in claim 1 or 4, wherein said medium/low speed tubes are opened all the time.

7. The intake manifold system as defined in claim 4, wherein said intake manifold valve is designed to slidably move along the direction in which said high and medium/low speed tubes are arranged.

8. The intake manifold system as defined in claim 4, wherein said intake manifold valve is designed to slidably move along the direction perpendicular to the direction in which said high and medium/low speed tubes are arranged.

9. The intake manifold system as defined in claim 4, wherein said valve guide has three edges provided with an angled flange for snugly and slidably fitting said intake manifold valve and keeping it from being detached, and the other edge is opened to allow the reciprocating movement of said intake manifold valve.

10. The intake manifold system as defined in claim 4, wherein the angled flange of the edge opposite to the opened edge is provided with a buffer made of a resilient materials to absorb the impact caused by said intake manifold valve being pushed to the inner surface of said angled flange.

11. The intake manifold system as defined in claim 1, wherein said drive means includes a vacuum actuator connected with said intake manifold system via a tube, said actuator being actuated by the vacuum produced by said intake manifold system.

12. The intake manifold system as defined in claim 1, wherein said drive means includes a rack formed in an end part of said connecting rod for gearing with a pinion of a reversely rotatable motor, which is controlled by an electronic control unit according to the signals generated by a vehicle speed sensor and throttle opening sensor.

* * * * *

UNITED STATES PATENT AND TRADEMARK OFFICE
CERTIFICATE OF CORRECTION

PATENT NO. : 5,542,385
DATED : August 6, 1996
INVENTORS : Yoonsuk KIM

It is certified that error appears in the above-identified patent and that said Letters Patent is hereby corrected as shown below:

Claim 1, column 5, lines 59-60, delete "and medium/low speed".

Signed and Sealed this

Twenty-second Day of October, 1996

Attest:

BRUCE LEHMAN

*Attesting Officer*  *Commissioner of Patents and Trademarks*